(12) United States Patent
Yuan

(10) Patent No.: US 8,363,653 B2
(45) Date of Patent: Jan. 29, 2013

(54) PACKET FORWARDING METHOD AND DEVICE

(75) Inventor: Kuo-Hua Yuan, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 239 days.

(21) Appl. No.: 12/251,171

(22) Filed: Oct. 14, 2008

(65) Prior Publication Data

US 2009/0097494 A1 Apr. 16, 2009

(30) Foreign Application Priority Data

Oct. 15, 2007 (TW) .............................. 96138403 A

(51) Int. Cl.
*H04L 12/56* (2006.01)
(52) U.S. Cl. ....................................... 370/392; 370/412
(58) Field of Classification Search ........................ None
See application file for complete search history.

(56) References Cited

U.S. PATENT DOCUMENTS

| 5,535,197 | A * | 7/1996 | Cotton ..................... 370/395.72 |
| 5,636,210 | A * | 6/1997 | Agrawal ....................... 370/390 |
| 6,310,875 | B1 * | 10/2001 | Nichols et al. ................ 370/388 |
| 6,438,146 | B1 * | 8/2002 | Brafford ........................ 370/537 |
| 2005/0021562 | A1* | 1/2005 | Idei et al. .................... 707/104.1 |
| 2007/0094457 | A1* | 4/2007 | Chuang ......................... 711/154 |

* cited by examiner

*Primary Examiner* — Gregory Sefcheck
*Assistant Examiner* — Daniel Mitchell
(74) *Attorney, Agent, or Firm* — McClure, Qualey & Rodack, LLP

(57) ABSTRACT

A packet forwarding mechanism using a packet map is disclosed. The method includes the packet map storing a packet forwarding information of each packet, where the packet map uses a single bit to indicate whether a packet is forwarding through a specific output port. In this way, the packet forwarding information can be stored in a very simple form such that less memory space is required for storing the packet forwarding information.

17 Claims, 7 Drawing Sheets

PACKET FORWARDING METHOD AND DEVICE

BACKGROUND OF THE INVENTION

1. Field of the Invention

The present invention relates to a managing mechanism for a packet forwarding method and a packet forwarding device, and more particularly, to a packet output management mechanism that reduces memory space.

2. Description of the Related Art

As is well known in the field of Ethernet networks, a switch for instance, is used for packet forwarding such that multiple network locations are connected together. The switch can assign dedicated bandwidth to individual ports and establish large and long working networks.

Ethernet packets can be classified into three types, namely the unicast, the multi-cast and the broadcast packets. On the basis of a memory-sharing mechanism (i.e., memory is shared by all output ports of a switch), a switch that receives a packet must determine in advance the destination output port through which the packet should be output, and then store relevant information of the packet into the output queue of the output port such that the output port can output the packets according to information stored.

The processing mechanisms of multi-cast and broadcast packets can be further classified into the following three processing categories.

The first processing mechanism copies the data of the packet into all the destination ports instead of copying the pointer of the packet only. This processing mechanism requires significant memory space and wastes bandwidth in the packet buffer.

The second processing mechanism creates a dedicated multi-cast packet queue such that all information related to the multi-cast packet can be stored into the queue. However, this may cause out-of-order hazards. For example, storage in the multi-cast and unicast queues may not reflect their respective priorities.

The third processing mechanism copies pointers of the multi-cast packets to every output queue. This mechanism is widely used in most of the switches and the detailed operations of the mechanism will be illustrated as follows.

Please refer to FIG. 1. FIG. 1 is a block diagram of a conventional switch 100. As shown in FIG. 1, each of the output ports 0 through 7 of the switch 100 has a corresponding output queue.

When the switch 100 receives a new packet, the switch 100 temporarily stores the packet into a packet buffer 110. In this case, we assume that the packet is stored in a block (e.g., the address of the block is #6 as shown in FIG. 1) of the packet buffer 110, and the packet needs to be outputted through output port 2. Next, the switch 100 determines that the packet needs to be outputted through output port 2 according to a certain look-up table (not shown). Next, the switch 100 reads pointer #6 that corresponds to the packet from a buffer queue 120 and stores the pointer #6 into the output queue of the output port 2.

In this way, when the output port 2 outputs a packet, the output port 2 outputs the packet in the output queue under First-In-First-Out (FIFO) rules. In the example shown in FIG. 1, the output port 2 outputs the packets corresponding to pointers #7, #2 and #6 sequentially.

The above-mentioned mechanism is straight forward and can be easily implemented, however, at the expense of several disadvantages. For example, if a multi-cast packet has to be stored into N output queues, the pointer of the multi-cast packet is copied N times before being stored into the output queues of the output ports which the multi-cast packet is to be outputted through. Therefore, the output queue of each output port must have sufficient storage space for storing the pointers of all the packets which the packet buffer may store. For example, in a most extreme case, all of the packets may be outputted through a same specific output port, so the output queue of the same specific output port must have sufficient storage space to store the pointers of all of the packets.

Assuming that the switch 100 comprises 8 output ports and the embedded packet buffer 110 is able to store 1024 packets, i.e. a 10-bit address is required to specify all the packets, the output queues of all the output ports in the switch 100 will have to occupy 10 bits*1024*8=10 Kbytes of storage space. In the case of multiple priorities (e.g. 8 different priorities), the output queues take up 10 Kbytes*8=80 Kbytes of storage space. Therefore, a massive amount of storage memory is required for the above-mentioned solutions.

SUMMARY OF THE INVENTION

An objective of the claimed invention is to provide a packet forwarding method and device, which can reduce the usage of memories and can still work under the FIFO mechanism.

According to an embodiment of the claimed invention, a packet forwarding method utilized in a packet forwarding device is disclosed. The packet forwarding device comprises N output ports and a packet buffer that is capable of storing K packets. The packet forwarding method comprises the steps of receiving and storing the K packets; creating a first bit map that comprises address information of the locations of the K packets in the packet buffer; creating a second bit map that comprises N sub-bit maps, wherein the N sub-bit maps respectively corresponding to the N output ports, and each sub-bit map comprising storage space of at least K bits for indicating output information of the K packets; looking up the second bit map to determine when a packet is to be outputted through a certain output port; looking up the first bit map to determine the address information of the packet to be outputted; reading out the packet to be outputted from the packet buffer according to the address information of the packet to be outputted; and forwarding the packet to be outputted through the output port.

According to another embodiment of the claimed invention, a packet forwarding device is disclosed. The packet forwarding device comprises N output ports for outputting packets; a packet buffer for buffering K packets; a first bit map comprising address information of the K packets located inside the packet buffer; and a second bit map comprising N sub-bit maps respectively corresponding to the N output ports; wherein each sub-bit map comprises at least K bits for indicating output information of the K packets at corresponding output ports.

The claimed embodiments cut down memory utilization by applying frame map(s) in the management of the packet output process. In addition, packet forwarding under FIFO rules is still preserved.

DETAILED DESCRIPTION OF THE INVENTION

Embodiments of the present invention makes use of frame maps to replace conventional methods of storing pointers directly into output queues. The frame map is capable of storing packet information in a simplified way.

Figure 1:
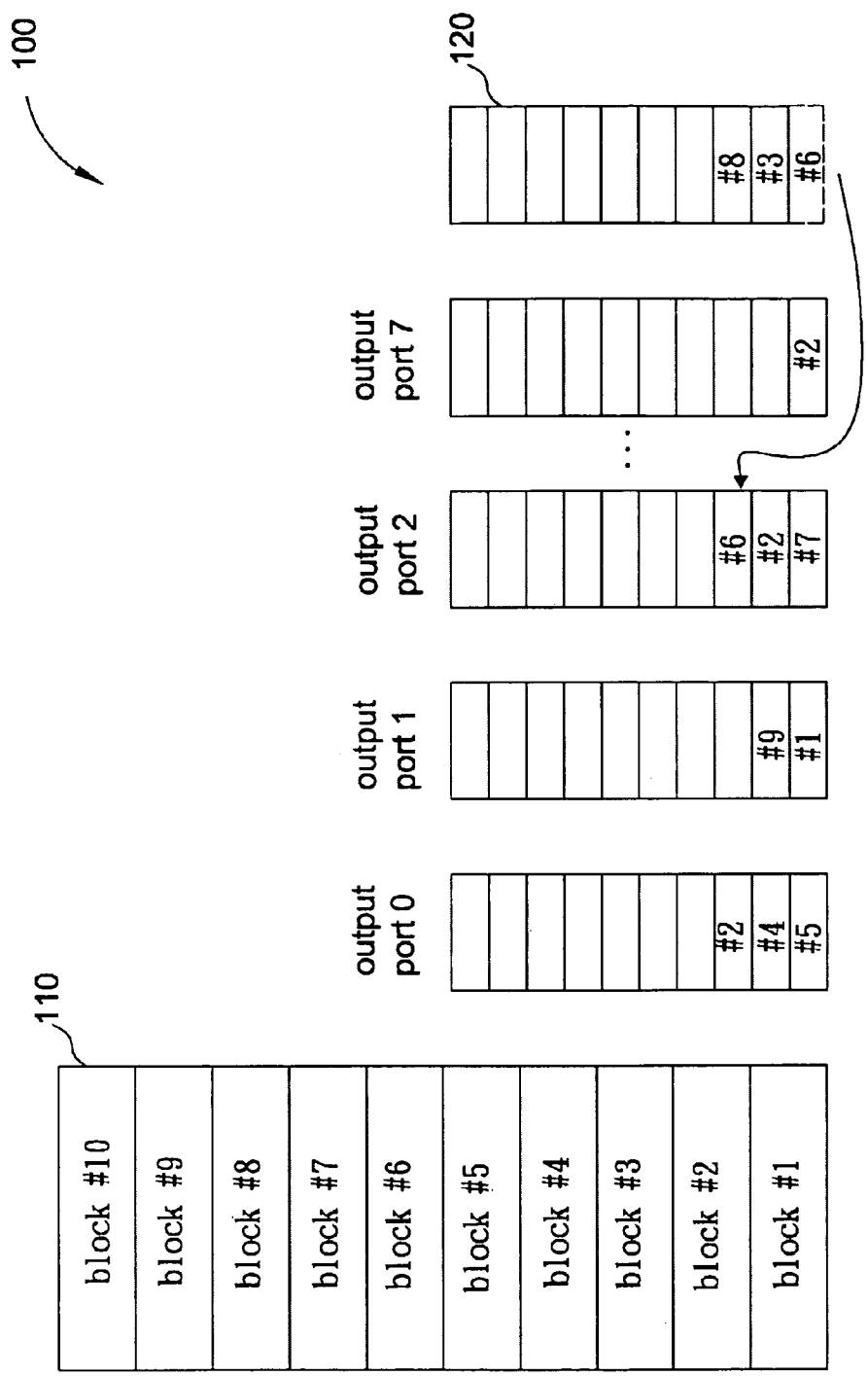
FIG. 1 is a block diagram of a conventional switch.
Figure 2:
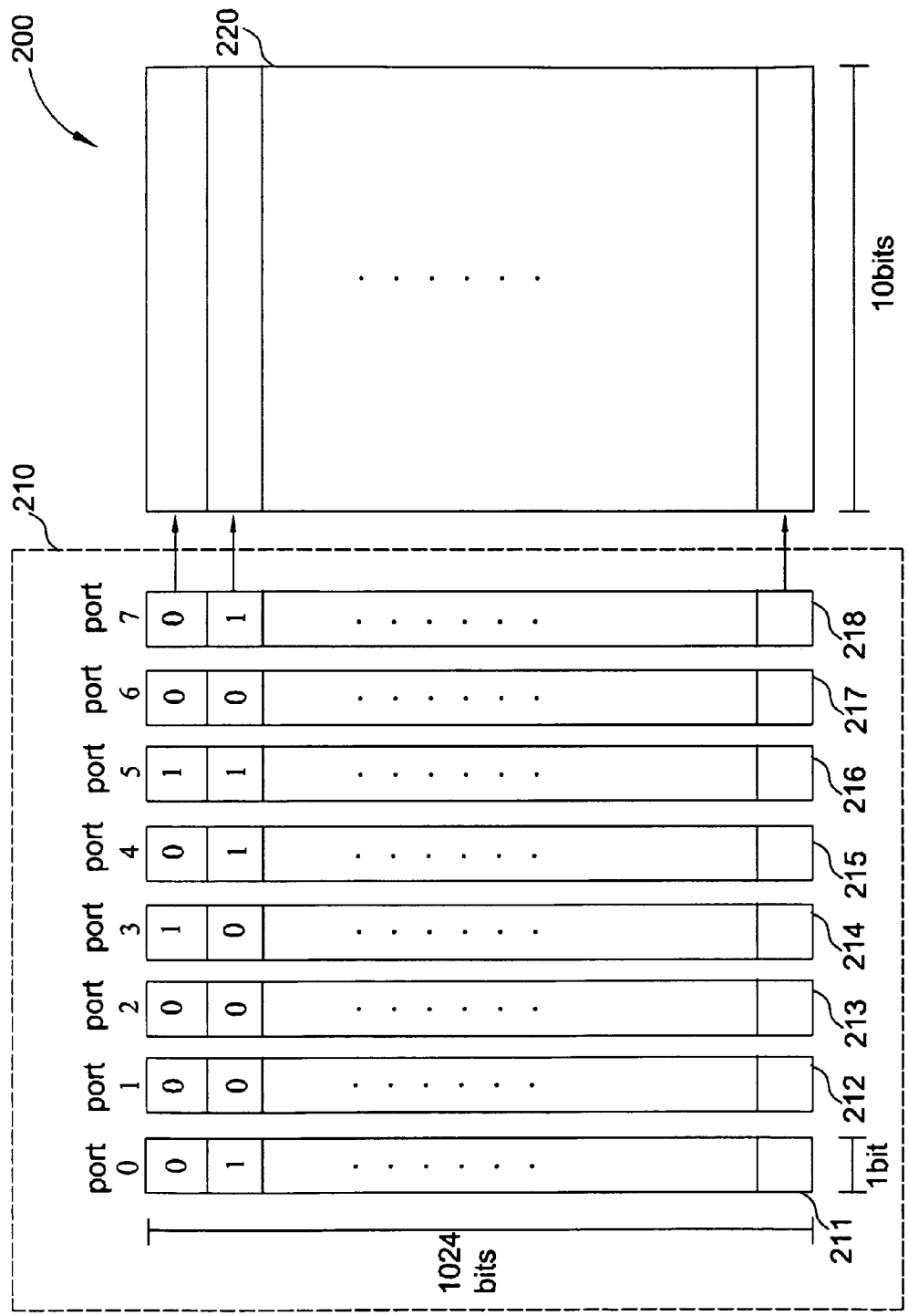
FIG. 2 is a diagram of a frame map illustrated according to an embodiment of the present invention.

Please refer to FIG. 2. FIG. 2 is a diagram of a frame map 200 illustrated according to an embodiment of the present invention. In this embodiment, in order to simplify the illustration of FIG. 2, packet priorities of all the packets are assumed to be the same. Furthermore, the switch utilized in the following embodiment has the same number of output ports (i.e., 8 output ports) as compared to the conventional switch 100, and the packet buffer is assumed to be storing 1024 packets. It should be noted that corresponding to the 1024 packets, the address of each packet can be represented by 10 bits.

As shown in FIG. 2, the frame map 200 comprises a packet output indication bit map 210 and a packet address indication bit map 220. The packet output indication bit map 210 is an 8*1024 bit map, and the packet address indication bit map 220 is a 10*1024 bit map. Each entry inside the bit maps 210 and 220 represent related information of a certain specific packet. In other words, the 8 bits of an entry of the bit map 210 works in collaboration with the 10 bits of an entry of the bit map 220 to represent the information of a packet.

For the packet output indication bit map 210, each bit of the 8 bits in an entry indicates whether a corresponding packet needs to be outputted through a specific output port corresponding to the bit. As shown in FIG. 2, the 8 bits represent the output condition of the packet at the output ports 0 through 7. The 8*1024 bit map 210 can be divided into eight 1*1024 sub-bit map 211 through 218. Each sub-bit map 211 through 218 represents the output condition of 1024 packets at a corresponding output port. For example, the logic value 1 may indicate that a packet needs to be outputted through an output port and logic value 0 thereby indicates that the packet does not need to be outputted through the output port. In this way, the 8 bits "00010100" of the first entry represent that the first packet needs to be outputted through the output ports 3 and 5.

The packet output indication bit map 220 refers to the corresponding 10 bits entry of the packet address indication bit map 220, which stores the pointer address of each packet. Each of the 1024 packets is then represented with the 10 bits address.

The process of forming frame map 200 is described as follows. First, when the switch receives a new packet, related information of the packet is stored in the frame map 200 and the packet is stored in the packet buffer. In a preferred embodiment, the switch temporarily stores the first packet into the packet buffer, stores the information about the output ports which the first received packet needs to be outputted through into the bit map 210 (e.g., the information is stored in the $1^{st}$ through $8^{th}$ bits of the first entry) of the frame map 200, and stores the corresponding address of the first packet into the first entry of the bit map 220. Next, for the second received packet, the switch stores the information about the output ports which the second packet needs to be outputted through into the $1^{st}$ through $8^{th}$ bits of the second entry of the bit map 210 and stores the corresponding address of the second packet into the second entry of the bit map 220. In this way, the packet information of all the 1024 packets can be stored entirely inside the frame map 200.

Furthermore, the process of how the switch uses the frame map 200 is described by the following example. First, the switch searches the bit map 210 of the frame map 200 for a packet to be outputted through a output port of the switch (e.g., searching a corresponding 1*1024 sub-bit map for a bit having a logic value 1 or 0), and then searches the bit map 220 for the address corresponding to the packet to be outputted. In this way, the switch can read the packet from the packet buffer according to the determined address, and outputs the packet through the above-mentioned port. After the packet is outputted, the switch can change the bit corresponding to the outputted packet in the bit map 210 from the logic value 1 to the logic value 0. This indicates that the packet has been outputted through the output port.

According to the foregoing disclosure, the frame map 200 is enough to record all of the information about the packets. Furthermore, the present invention does not need to copy the packet information for multiple output ports because the frame map 200 is not stored in the same way as the above-mentioned output queue. In an actual implementation, only one frame map 200 is created for the utilization of the output ports. That is, the same frame map 200 is searched to determine corresponding packets to be outputted. In addition, as mentioned previously, the size of the frame map 200 is: (8+10)*1024 bits=2.25 Kbytes. In contrast to the conventional output queues that consume 10 Kbytes of storage space, significant storage space is thus saved.

In the case of increasing numbers of output ports or a larger packet buffer, the advantage of storage space reduction becomes even more evident. For example, if the number of output ports is 30 and the packet buffer contain 4096 packets, a total number of 30*4096*12 bits=180 Kbytes of storage space would be required conventionally. Nonetheless, given the same example, the present invention consumes (30+12)*4096 bits=21 K bytes of storage space only. Hence, memory is thereby saved with the application of the embodiments of the present invention.

However, the frame map 200 shown in FIG. 2 has its drawbacks yet to be solve. In regards to each output port of FIG. 2, a 1*1024 sub-bit map is searched. This indicates that only one bit of each output port is read in a clock cycle. Therefore, if the packet to be outputted corresponds to the last bit of the 1*1024 sub-bit map, then the output port would require 1,024 clock cycles to find the packet. This induces a big problem in high speed network, since a subsequent packet should be outputted in 150 clock cycles in the gigabyte-level, or else a transmission discontinuation will result. Therefore, the above-mentioned frame map 200 may not meet the required standards.

In addition, the above-mentioned frame map 200 would also require a specialized mechanism in order to be in compliance with the FIFO rules. The FIFO rules are to be followed in order to prevent data from being disordered. After all output ports have forwarded a specific packet, the switch can remove the information corresponding to the specific packet from the frame map 200 such that the released storage space can be provided to a next received packet. However, if the packet information of the next received packet is directly stored into the previously released storage space, then the order of the input packets will no longer conform to the FIFO rules.

For example, if the 8 bits of the first entry of the bit map 210, which corresponds to the first packet, all correspond to 0, then this indicates that all of the output ports are finished with the process of the first packet. Therefore, the switch can release the space of an entry for a next packet. However, because the bit map 210 has only the first entry for the next packet, information of the next packet can only be stored into the first entry of the bit map 210. When the bit map 210 is searched for a packet to be outputted, the packet now corresponding to the first entry is the next packet, and will to be outputted first. Accordingly, it can be seen that the next packet may be outputted earlier than any other prior packets and introduces hazards of packets being outputted out of order.

Therefore, in the following disclosure, a method and mechanism to solve the aforementioned problem is presented.

Figure 3:
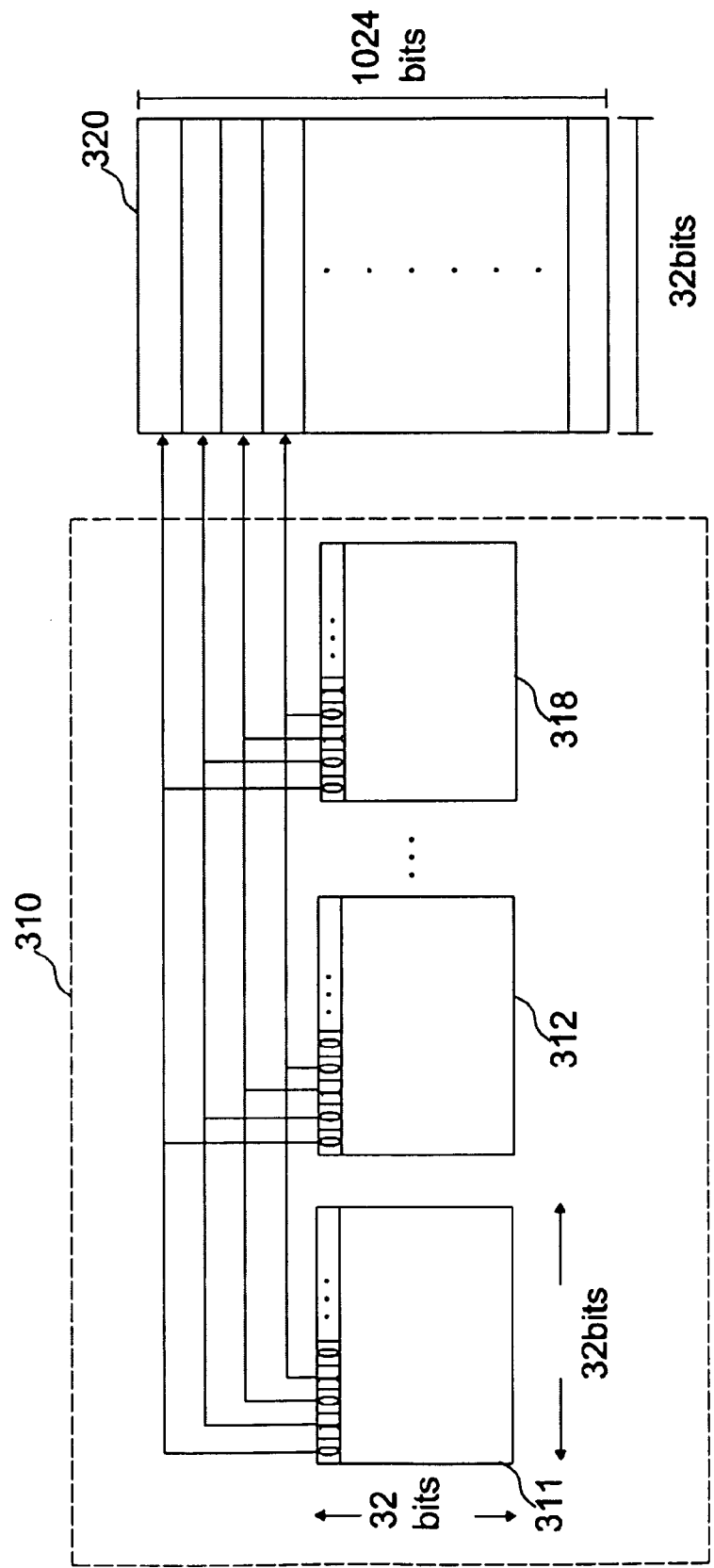
FIG. 3 is a diagram showing a frame map according to a preferred embodiment of the present invention.

Please refer to FIG. 3. FIG. 3 is a diagram showing a frame map 300 according to a preferred embodiment of the present invention. As shown in FIG. 3, the frame map 300 can be divided into a packet output indication bit map 310 and a packet address indication bit map 320.

It should be noted that the packet address indication bit map 320 of the frame map 300 is substantially the same as the above-mentioned packet address indication bit map 220. Detailed descriptions regarding the packet address indication bit map 320 is thus omitted here for the sake of brevity. The packet output indication bit map 310 and the packet output indication bit map 210 are however, designed differently. Therefore, the packet output indication bit map 310 will be described in detail in the following paragraphs.

As shown in FIG. 3, in the packet output indication bit map 310, each of the sub-bit maps 311-318 corresponding to the output ports is a 32 by 32 bit map instead of the above-mentioned 1 by 1024 bit map. In this way, when the output port searches the bit map for a packet to be outputted, the output port can search 32 bits per clock cycle. For each of the sub-bit maps 311 through 318, only 32 clock cycles are required for searching the entire sub-bit maps 311 through 318. Furthermore, as is well-known in the art, the output ports search the corresponding sub-bit maps 311 through 318 synchronously. Therefore, for the entire packet output indication bit map 310, only 32 clock cycles are required for a searching operation.

In the actual implementation, the 1 by 1024 bit map can be divided into 32 groups according to the order of each bit, and the bits in the same group can be stored in the same page of a memory. For example, the memory storing the frame map 300 can be arranged as 32 memory banks, and each memory bank can be used to store a group consisting of 32 bits. In this way, the 1 by 1024 bit map can be converted into a 32 by 32 bit map. As is well known in the art, if data are stored in the same memory page, only a single clock cycle is required to read/write these data. Therefore, each of the output ports can read 32 bits simultaneously to search for a packet to be outputted.

Please note that the number of bits in a group mentioned (e.g., in the above-mentioned embodiment that number is 32) is merely an embodiment, and is not meant to be a limitation of the present invention. In the actual implementation, the memory can be arranged with more memory banks or with a larger width of the sub-bit map, a 64 by 16 dimension for instance. In this way, the output port can read 64 bits simultaneously such that the searching operation can be performed more efficiently.

In addition, the present invention provides a solution in the following disclosure in order to maintain the FIFO characteristic of the output packets. Please note that the packet indication bit map 310 is illustrated as a 32 by 32 bit map for simplicity.

Figure 4:
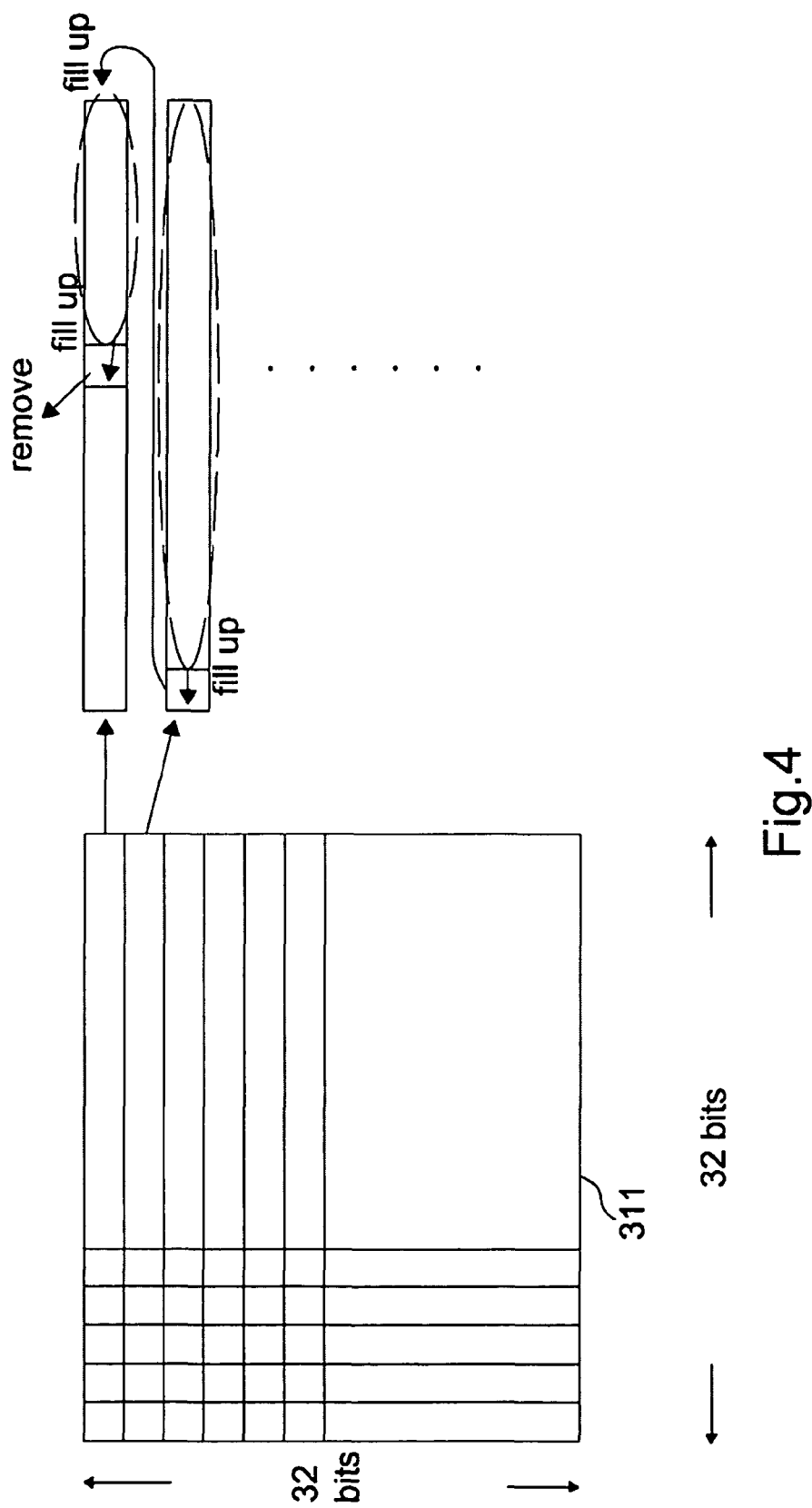
FIG. 4 depicts an updating mechanism of the packet output indication bit map shown in FIG. 3.

Please refer to FIG. 4. FIG. 4 depicts an updating mechanism of the packet output indication bit map 310 shown in FIG. 3. Only one-sub bit map 311 is shown in FIG. 4 for the sake of better understanding. As mentioned previously, after a packet has been processed by all the output ports, the occupied memory space should be released for a next packet. However, the present invention makes bits, which are positioned after the released bit, move forward to fill the vacant bit such that the information of the next packet can be stored in the last bit of the frame map to prevent the disordering of packets. The process of moving the bits forward can be either overwriting empty bits or bits representing output information of packets that are already released.

For example, if the $5^{th}$ packet has been processed by all output ports, then the switch has to remove the $5^{th}$ bit of the $1^{st}$ row of each of the sub-bit maps in the packet output indication bit map 310. In the following disclosure, FIG. 4 depicts a sub-bit map for illustration.

Referring to the embodiment shown in FIG. 4, the bits after the $5^{th}$ bit are moved forward to fill the $5^{th}$ bit such that the information of a next packet can be correctly stored in the last bit of the sub-bit map instead of incorrectly stored in the $5^{th}$ bit of the $1^{st}$ row. In this case, the $6^{th}$ through $32^{nd}$ bits of the first row are moved forward to become the $5^{th}$ through $31^{st}$ bits of the first row, the $1^{st}$ bit of the $2^{nd}$ row is moved to the $1^{st}$ row to become the $32^{nd}$ bit of the first row, the $2^{nd}$ through $32^{nd}$ bits are moved forward to become $1^{st}$ through $31^{st}$ bits of the second row, the $1^{st}$ bit of the $3^{rd}$ row is moved to the second row to become the $32^{nd}$ bit of the second row, and so on. Therefore, the memory space of the $32^{nd}$ bit of the $32^{nd}$ row in the 32 by 32 bit map is released to store the information of the next packet.

In this way, information of the next packet will be stored into the last position of the frame map so as to meet the FIFO requirements of avoiding packet disorder.

Figure 5:
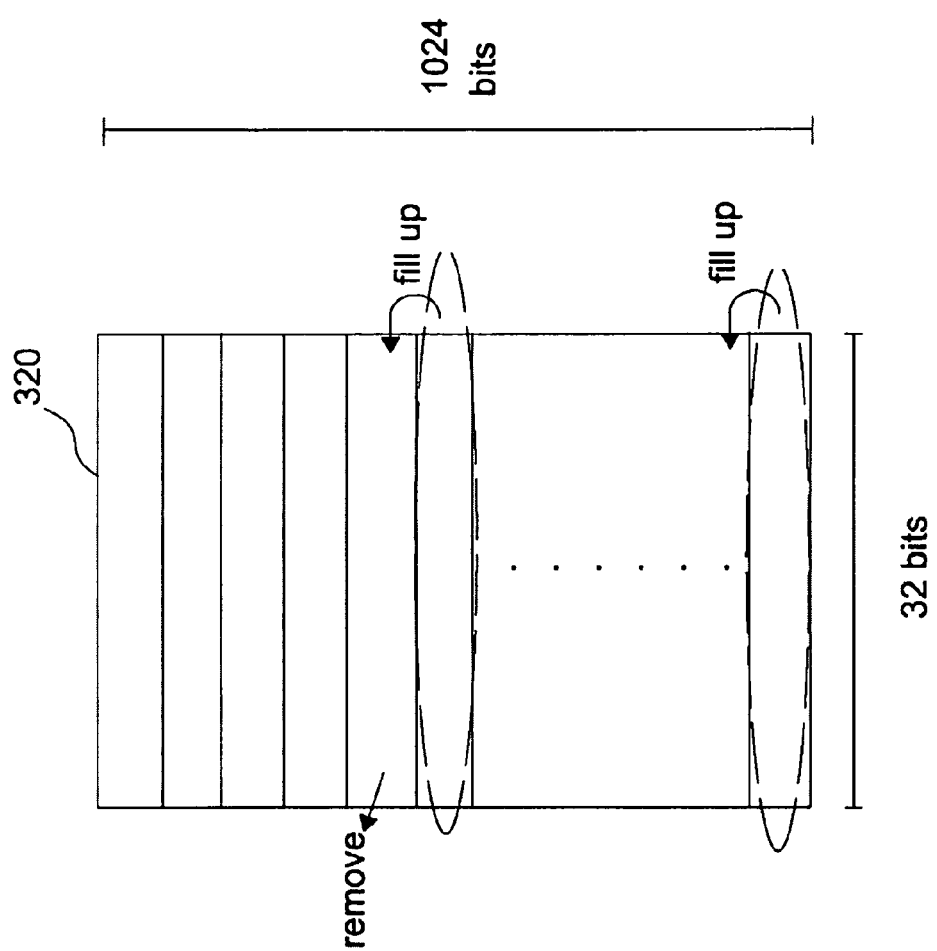
FIG. 5 depicts the updating mechanism of the packet address indication bit map shown in FIG. 3.

Please refer to FIG. 5. FIG. 5 depicts the updating mechanism of the packet address indication bit map 320 shown in FIG. 3. It is assumed that the $5^{th}$ packet has been processed by all output ports, meaning that the $5^{th}$ bit inside the packet address indication bit map 320 can be discarded. Therefore, the switch of a preferred embodiment removes the $5^{th}$ bit to release the memory space.

Similarly, the present invention moves the data located after the removed $5^{th}$ bit (i.e., $6^{th}$ through $1024^{th}$ bits) forward to fill the removed data (i.e., $5^{th}$ through $1023^{rd}$ bits). Therefore, the last data ($1024^{th}$ bit) is released for the next packet to use. In this way, the packet address indication bit map 320 can correspond to the packet output indication bit map 310 shown in FIG. 4.

According to the above mechanism, the frame map 300 can roughly meet the above-mentioned FIFO demands to forward the packets correctly. It should be noted that when the packets are stored into the frame map 300 according to the receiving order, the frame map 300 should be searched according to that order such that proper orderliness of the forwarding packets can be maintained. For example, if the current packet to be forwarded is the $100^{th}$ packet, then the output port can search for the next packet to be forwarded from the very beginning $1^{st}$ bit of the bit map 310. Alternately, the output port can search for the next packet to be forwarded from the $101^{st}$ bit (i.e., the $101^{st}$ bit of the bit map 310), when the next packet to be forwarded is determined (e.g., the $250^{th}$ packet), the $1^{st}$ through $100^{th}$ bits are rechecked again to make sure that a packet corresponding to one of the $1^{st}$ through $100^{th}$ bits are not to be forwarded. If a packet corresponding to one of the 1$^{st}$ through 100$^{th}$ bits is to be forwarded, then that certain packet is forwarded such that the FIFO demand/configuration is maintained.

Figure 6:
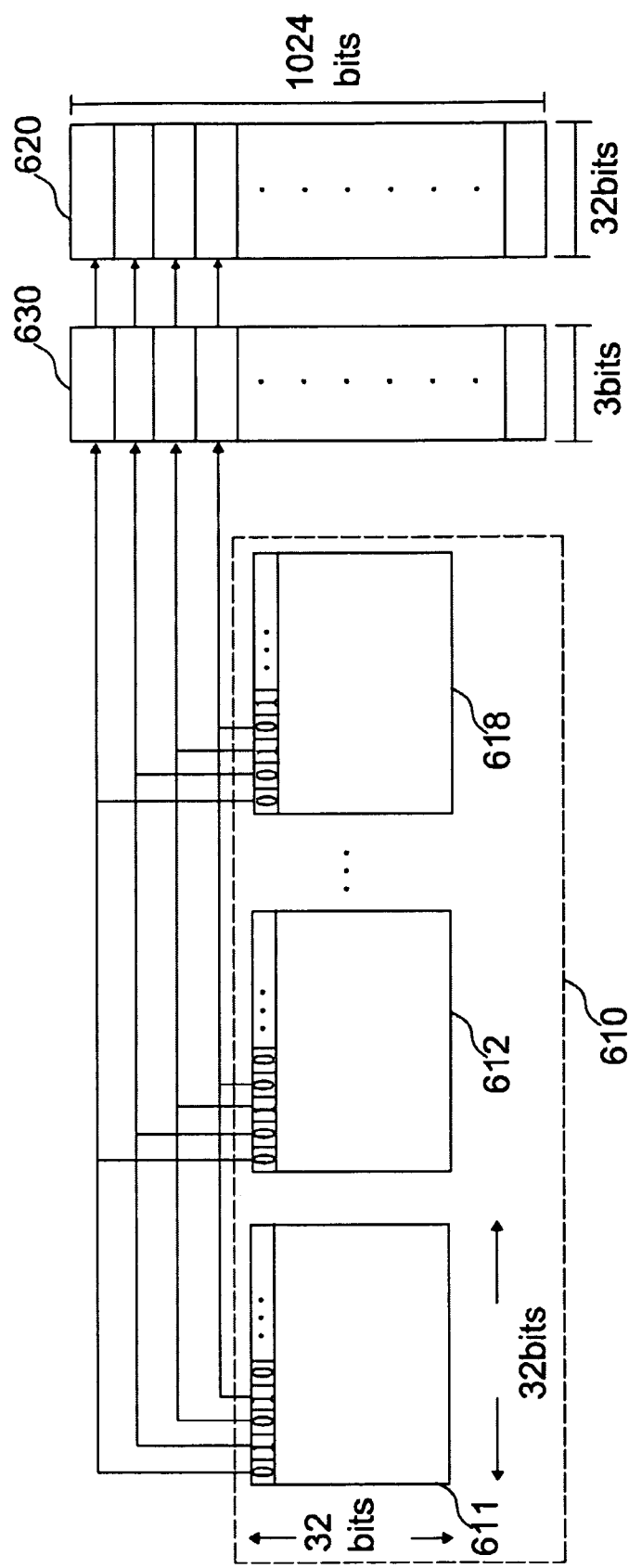
FIG. 6 is a diagram showing a frame map supporting multiple packet priorities according to an embodiment of the present invention.

Referring to FIG. 6, which is a diagram showing a frame map 600 supporting multiple packet priorities according to an embodiment of the present invention. As shown in FIG. 6, the switch is assumed to be supporting 8 priorities. 3 bits are thereby used in this embodiment to indicate the specific priority of a packet corresponding to an entry of the frame map 600 such that a priority bit map 630 is formed. In other words, each of the rows in the priority bit map 630 represents a specific priority of a packet.

In the actual implementation, a switch may include a scheduler for determining the priority. Therefore, each of the sub-bit maps 611 through 618 is searched for a candidate packet, and the priority corresponding to the candidate packet read for compliance. If the priority corresponding to the candidate packet complies with the priority determined by the scheduler, then the candidate packet is the packet to be outputted. The output port searches the packet address indication bit map 620 for the address of the packet to be outputted such that the output port can read the packet to be outputted from the packet buffer to output.

Similarly, in order to meet the FIFO demands, if a certain packet has be processed by all the output ports, the packet address indication bit map 620 and the priority bit map 630 should be updated according to the steps shown in FIG. 5 to avoid disordering of the packets. One having ordinary skills in the art can understand any related operations, and thus further illustration is omitted herein for the sake of brevity.

Similarly, because the information of the packets are stored into the frame map 600 according to the receiving order, the output port must search the frame map 600 according to the storing order of the packets to prevent disordering. For example, the output port preferably searches the bit map 610 from the first bit and search for the corresponding priority to check whether a candidate packet is a packet to be outputted. Alternatively, the output port can search from latter bits, however, the output port must check the preceding bits to confirm that there is no packet to be outputted previous to the candidate packet. This will ensure that the FIFO configuration is maintained.

Figure 7:
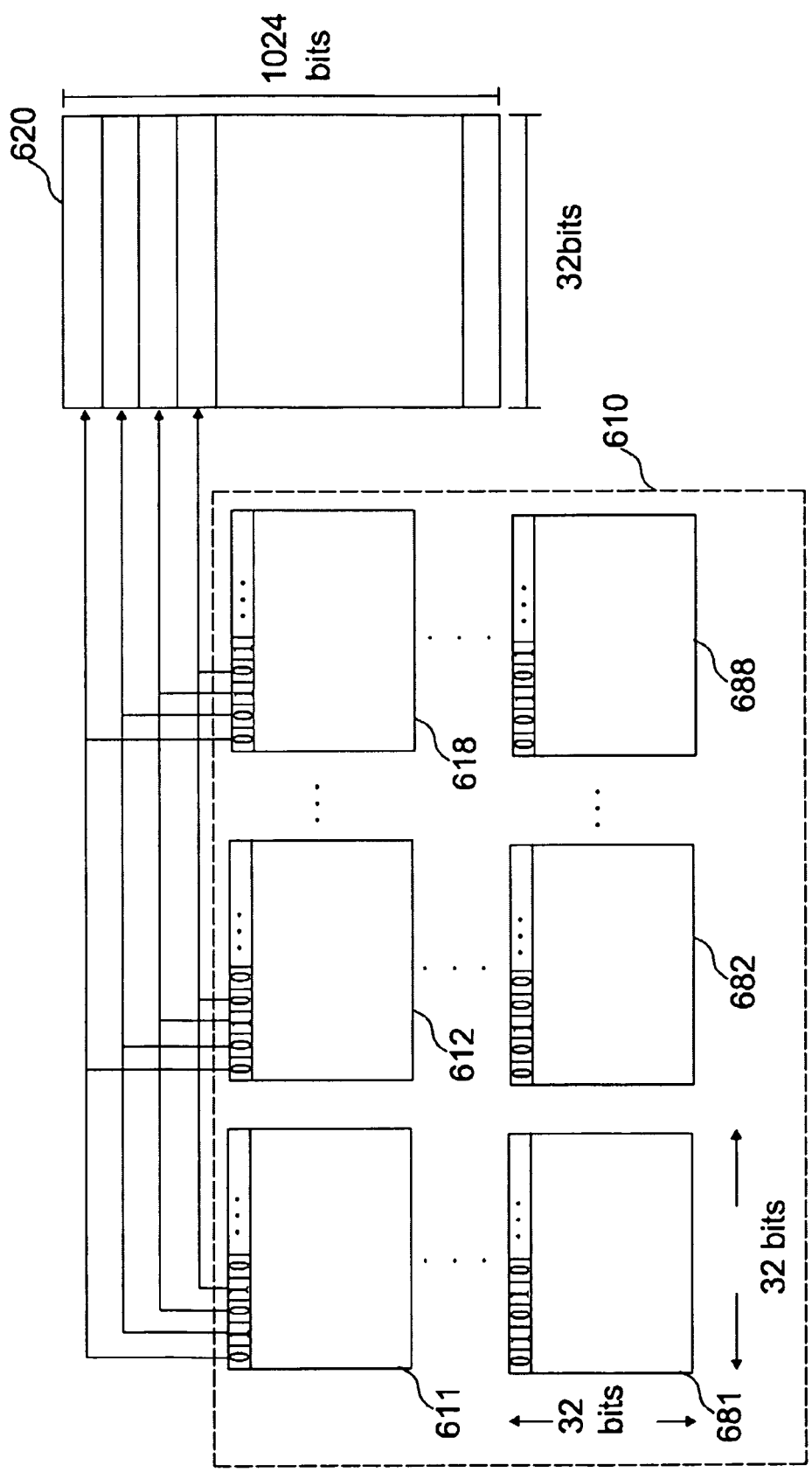
FIG. 7 is a diagram showing a frame map supporting multiple packet priorities according to another embodiment of the present invention.

Please note that the frame map shown in FIG. 6 is only an embodiment, and is not a limitation of the present invention. Referring to FIG. 7, which is a diagram of a frame map supporting multiple priorities illustrated according to another embodiment of the present invention. As shown in FIG. 7, it is assumed that the switch can support 8 priorities. Because a packet corresponds to a specific priority, each output port corresponds to 8 sub-bit maps, where a sub-bit map represents a single priority. For example, for the first output port, the sub-bit maps 611, 621, 631, . . . , 681 respectively correspond to 8 different priorities, for the second output port, the sub-bit maps 612, 622, 632, . . . , 682 respectively correspond to 8 different priorities, and so on. Therefore, after the priority to be outputted is determined, the output port can directly search for the sub-bit map corresponding to the determined priority such that a packet to be outputted is determined. Similar modifications that obey the spirit of the disclosed features should also be regarded as the scope of the present invention.

In contrast to the prior art, the present invention utilizes a frame map to manage the output of packets. Memory is thus reduced while drawbacks of FIFO hazards are also prevented.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A packet forwarding method, utilized in a packet forwarding device comprising N output ports and a packet buffer, the packet buffer capable of storing K packets, the packet forwarding method comprising the steps of:
   receiving K packets;
   storing the K packets in the packet buffer;
   creating a first bit map comprising address information of the locations of the K packets in the packet buffer;
   creating a second bit map comprising N sub-bit maps, the N sub-bit maps respectively corresponding to the N output ports, each sub-bit map comprising storage space of at least K bits for indicating output information of the K packets;
   looking up the second bit map to find a packet to be outputted through at least one of the N output ports;
   looking up the first bit map to find the address information of the packet to be outputted;
   reading out the packet to be outputted from the packet buffer according to the address information of the packet to be outputted; and
   forwarding the packet to be outputted through the at least one of the N output ports;
   wherein the step of looking up the second bit map to find the packet to be outputted through at least one of the N output ports comprises:
   finding a first bit complying with a predetermined condition from each sub-bit map corresponding to the at least one of the N output ports;
   checking whether a preceding second bit complying with the predetermined condition exists, if the preceding second bit exists, then setting a packet corresponding to the preceding second bit as the packet to be outputted, otherwise, setting a packet corresponding to the first bit as the packet to be outputted.

2. The packet forwarding method of claim 1, wherein each sub-bit map in the second bit map is a K1 rows by K2 columns bit map, K=K1×K2.

3. The packet forwarding method of claim 2, further comprising:
   storing the second bit map in a memory;
   wherein bits of a same row of each sub-bit map in the second bit map are stored in a same memory page.

4. The packet forwarding method of claim 1, further comprising:
   creating a third bit map for indicating priority information of the K packets.

5. The packet forwarding method of claim 4, further comprising:
   finding the packet to be outputted through the output port according to the second bit map and the third bit map.

6. The packet forwarding method of claim 5, further comprising:
   removing the address information, the output information and the priority information corresponding to the specific packet from the first bit map, the second bit map, and the third bit map, respectively, if the N output ports have completed the forwarding task of a specific packet.

7. The packet forwarding method of claim 5, wherein the step of finding the packet to be outputted through the output port according to the second bit map and the third bit map comprises:

finding a first bit complying with a predetermined condition from each sub-bit map corresponding to the at least one of the N output ports;

setting a packet corresponding to the first bit as a candidate packet; and setting the candidate packet as the packet to be outputted if the candidate packet complies with a predetermined priority.

8. The packet forwarding method of claim 7, wherein the step of finding a first bit complying with a predetermined condition from each sub-bit map corresponding to the at least one of the N output ports comprises:

searching from the beginning of each sub-bit map corresponding to the at least one of the N output ports until a bit with a specific logic value is encountered; and setting the bit with the specific logic value encountered as the first bit.

9. The packet forwarding method of claim 5, wherein the step of finding the packet to be outputted through the output port according to the second bit map and the third bit map comprises:

searching each sub-bit map corresponding to the at least one of the N output ports for a first bit complying with a predetermined condition;

checking whether a preceding second bit complying with the predetermined condition exists, if the preceding second bit complying with the predetermined condition exists, then setting a packet corresponding to the second bit as a candidate packet, otherwise, setting a packet corresponding to the first bit as the candidate packet; and checking whether data corresponding to the candidate packet comply with a predetermined priority, if the data corresponding to the candidate packet comply with the predetermined priority, then setting the candidate packet as the packet to be outputted.

10. The packet forwarding method of claim 9, wherein the step of searching each sub-bit map corresponding to the at least one of the N output ports for the first bit complying with the predetermined condition comprises:

searching from the beginning of each sub-bit map corresponding to the at least one of the N output ports until a bit with a specific logic value is encountered; and setting the bit with the specific logic value encountered as the first bit.

11. The packet forwarding method of claim 1, further comprising:

overwriting the address information of the specific packet with the address information located right next behind in the first bit map after forwarding the packet to be outputted through the at least one of the N output ports.

12. The packet forwarding method of claim 1, further comprising:

overwriting the output information of the specific packet with the output information located right next behind in the second bit map after forwarding the packet to be outputted through the at least one of the N output ports.

13. A packet forwarding method, utilized in a packet forwarding device comprising N output ports and a packet buffer, the packet buffer capable of storing K packets, the packet forwarding method comprising the steps of:

receiving K packets; storing the K packets in the packet buffer;

creating a first bit map comprising address information of the locations of the K packets in the packet buffer;

creating a second bit map comprising N sub-bit maps, the N sub-bit maps respectively corresponding to the N output ports, each sub-bit map comprising storage space of at least K bits for indicating output information of the K packets;

looking up the second bit map to find a packet to be outputted through at least one of the N output ports;

looking up the first bit map to find the address information of the packet to be outputted;

reading out the packet to be outputted from the packet buffer according to the address information of the packet to be outputted; forwarding the packet to be outputted through the at least one of the N output ports; and creating a third bit map for indicating priority information of the K packets;

overwriting the priority information of the specific packet with the priority information located right next behind in the third bit map after forwarding the packet to be outputted through the at least one of the N output ports.

14. A packet forwarding device comprising:

N output ports for outputting packets;

a packet buffer, for buffering K packets;

a first bit map, comprising address information of the K packets located inside the packet buffer; and a second bit map, comprising N sub-bit maps respectively corresponding to the N output ports, each sub-bit map comprising K bits respectively indicating output information of the K packets at corresponding output ports, wherein after the packet to be outputted is forwarded through the at least one of the N output ports, the address information and output information of the packet to be outputted are overwritten with the address information and output information respectively located right next behind in the first bit map and second bit map.

15. The packet forwarding device of claim 14, wherein each sub-bit map of the second bit map is a K1 rows by K2 columns bit map, K=K1×K2.

16. The packet forwarding device of claim 14, further comprising:

storing the second bit map in a memory;

wherein bits of a same row of each sub-bit map in the second bit map are stored in a same memory page.

17. A packet forwarding device comprising:

N output ports for outputting packets;

a packet buffer, for buffering K packets;

a first bit map, comprising address information of the K packets located inside the packet buffer;

a second bit map, comprising N sub-bit maps respectively corresponding to the N output ports, each sub-bit map comprising K bits respectively indicating output information of the K packets at corresponding output ports; and a third bit map, for indicating priority information of the K packets;

wherein after the packet to be outputted is forwarded through the at least one of the N output ports, the priority information of the packet to be outputted is overwritten with the priority information located right next behind in the third bit map.

* * * * *